(12) United States Patent
Youn et al.

(10) Patent No.: US 11,411,282 B2
(45) Date of Patent: Aug. 9, 2022

(54) POROUS SEPARATOR INCLUDING POROUS LAYER INCLUDING PLATE-TYPE INORGANIC PARTICLES AND POROUS COATING LAYER INCLUDING SPHERICAL INORGANIC PARTICLES AND ELECTROCHEMICAL DEVICE INCLUDING THE SAME

(71) Applicant: LG CHEM, LTD., Seoul (KR)

(72) Inventors: Suk Il Youn, Daejeon (KR); Minehul Jang, Daejeon (KR); Byoungkuk Son, Daejeon (KR); Yeilin Ham, Daejeon (KR); Da Young Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 285 days.

(21) Appl. No.: 16/644,624

(22) PCT Filed: Dec. 17, 2018

(86) PCT No.: PCT/KR2018/015984
§ 371 (c)(1),
(2) Date: Mar. 5, 2020

(87) PCT Pub. No.: WO2019/117687
PCT Pub. Date: Jun. 20, 2019

(65) Prior Publication Data
US 2021/0083250 A1 Mar. 18, 2021

(30) Foreign Application Priority Data
Dec. 15, 2017 (KR) .................... 10-2017-0173537
Dec. 14, 2018 (KR) .................... 10-2018-0162329

(51) Int. Cl.
*H01M 50/446* (2021.01)
*H01M 50/449* (2021.01)
*H01M 10/0525* (2010.01)

(52) U.S. Cl.
CPC ..... *H01M 50/446* (2021.01); *H01M 10/0525* (2013.01); *H01M 50/449* (2021.01)

(58) Field of Classification Search
CPC ................ H01M 50/446; H01M 50/449
(Continued)

(56) References Cited

U.S. PATENT DOCUMENTS

2005/0221192 A1 10/2005 Hennige et al.
2011/0003209 A1 1/2011 Katayama et al.
(Continued)

FOREIGN PATENT DOCUMENTS

CN  102150298 A  8/2011
CN  102725670 A  10/2017
(Continued)

OTHER PUBLICATIONS

Extended European Search Report for European Application No. 18889691.4, dated Oct. 19, 2020.
(Continued)

*Primary Examiner* — Sean P Cullen
(74) *Attorney, Agent, or Firm* — Birch, Stewart, Kolasch & Birch, LLP (57) ABSTRACT

A porous separator including a porous layer including plate-type inorganic particles, and a first binder polymer located on a part of or all surfaces of the plate-type inorganic particles, wherein the first binder polymer connects and fixes the plate-type inorganic particles, and an electrochemical device including the same.

8 Claims, 4 Drawing Sheets

(58) Field of Classification Search
USPC .................................. 429/144, 251, 254
See application file for complete search history.

(56) References Cited

U.S. PATENT DOCUMENTS

| | | | |
|---|---|---|---|
| 2011/0039145 A1 | 2/2011 | Abe et al. | |
| 2011/0135987 A1 | 6/2011 | Shin | |
| 2011/0171535 A1 | 7/2011 | Ohinshi et al. | |
| 2012/0270090 A1 | 10/2012 | Shinohra et al. | |
| 2013/0280583 A1 | 10/2013 | Lee et al. | |
| 2017/0133653 A1 | 5/2017 | Lee et al. | |
| 2019/0020008 A1* | 1/2019 | Kim .................... | H01M 50/403 |
| 2019/0260001 A1 | 8/2019 | Gu et al. | |

FOREIGN PATENT DOCUMENTS

| | | |
|---|---|---|
| DE | 102 38 943 A1 | 3/2004 |
| EP | 2779277 A1 | 9/2014 |
| JP | 2008-210791 A | 9/2008 |
| JP | 2013-222581 A | 10/2013 |
| JP | 2013222581 A * | 10/2013 |
| JP | 2015-88430 A | 5/2015 |
| KR | 10-2008-0082289 A | 9/2008 |
| KR | 10-2011-0064689 A | 6/2011 |
| KR | 10-1229902 B1 | 2/2013 |
| KR | 10-2013-0133446 A | 12/2013 |
| KR | 10-2016-0007147 A | 1/2016 |
| KR | 10-2017-0053448 A | 5/2017 |
| KR | 10-1758946 B1 | 7/2017 |
| WO | WO 2008/108583 A1 | 9/2008 |
| WO | WO 2010/138177 A1 | 12/2010 |
| WO | WO 2017/018483 A1 | 2/2017 |
| WO | WO 2017/033993 A1 | 3/2017 |
| WO | WO-2017033993 A1 * | 3/2017 ........ H01M 10/0525 |
| WO | WO 2017/213443 A1 | 12/2017 |
| WO | WO-2018038584 A1 * | 3/2018 .......... H01M 10/052 |

OTHER PUBLICATIONS

International Search Report (PCT/ISA/210) issued in PCT/KR2018/015984, dated Mar. 25, 2019.

* cited by examiner

POROUS SEPARATOR INCLUDING POROUS LAYER INCLUDING PLATE-TYPE INORGANIC PARTICLES AND POROUS COATING LAYER INCLUDING SPHERICAL INORGANIC PARTICLES AND ELECTROCHEMICAL DEVICE INCLUDING THE SAME

TECHNICAL FIELD

This application claims priority to and the benefits of Korean Patent Application No. 10-2017-0173537, filed with the Korean Intellectual Property Office on Dec. 15, 2017, and Korean Patent Application No. 10-2018-0162329, filed with the Korean Intellectual Property Office on Dec. 14, 2018, the entire contents of which are incorporated herein by reference.

The present invention relates to a porous separator and an electrochemical device including the same, and relates to a porous separator capable of blocking lithium ion dendrite, and having improved high temperature safety due to excellent thermal properties, and an electrochemical device including the same.

BACKGROUND ART

Interests in energy storage technologies have been increasingly growing recently. As applications have expanded to energy of mobile phones, camcorders and notebook PCs, and furthermore, to electric vehicles, efforts on the research and development of electrochemical devices have been more and more materialized. Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and specific energy.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous solution electrolyte liquid. However, such a lithium ion battery has a safety problem such as ignition and explosion caused by using an organic electrolyte liquid, and has a disadvantage of complicated manufacturing.

Recent lithium ion polymer batteries have been recognized as one of next generation batteries by improving such weaknesses of lithium ion batteries, however, battery capacity is still relatively low compared to lithium ion batteries, and particularly, discharge capacity at a low temperature is insufficient, and improvements thereon are urgently required.

Electrochemical devices such as above have been produced in many companies, however, they are very different in their safety features. For such electrochemical devices, evaluating safety and securing safety are very important. A most important consideration is not to inflict an injury on a user in case of an electrochemical device malfunction, and for such a purpose, ignition and smoking generation and the like in an electrochemical device have been strictly regulated in the safety requirement. In the safety features of an electrochemical device, there is great concern for explosion when thermal runaway occurs due to electrochemical device overheating, or a separator is penetrated. Particularly, a polyolefin-based porous substrate commonly used as a separator of an electrochemical device shows an extreme thermal shrinkage behavior at a temperature of 100° C. or higher due to material properties and properties in a manufacturing process including elongation causing a short circuit between a cathode and an anode.

In order to resolve such a safety problem of an electrochemical device, a separator forming a porous organic-inorganic coating layer by coating a mixture of an excess amount of inorganic particles and a binder polymer on at least one surface of a polyolefin-based porous substrate having a number of pores has been proposed.

However, the porous layer herein may have coating defects on the surface due to cracks occurring during a preparation process, for example, a drying process. As a result, the organic/inorganic composite porous layer may be readily desorbed from the polyolefin-based porous substrate when assembling a secondary battery or using a battery, and this leads to decline in the battery safety. In addition, slurry for forming a porous layer coated on the polyolefin-based porous substrate to form the porous layer increases packing density of the particles during drying resulting in parts packed in high density, which causes a problem of declining air permeability properties.

In addition, heavy metal components unavoidably incorporated in a battery electrode plate preparation process and a raw material preparation process are precipitated on an anode surface while being oxidized and reduced during a battery activation process, and metal lithium needle crystals (dendrite) produced as a result cause a micro-short in a cathode or an anode causing a voltage drop in the battery.

Accordingly, needs for a more improved separator that may contribute to battery stability are still present due to the nature of the battery industry in need of an increasingly higher level of stability.

PRIOR ART DOCUMENTS (Patent Document 1) Korean Patent Application Laid-Open Publication No. 10-2017-0053448

DISCLOSURE

Technical Problem

Accordingly, an aspect of the present invention provides a porous separator capable of preventing a short circuit phenomenon between a cathode and an anode caused by dendrite growth, and having improved high temperature safety due to excellent thermal properties, and an electrochemical device including the same.

Technical Solution

According to an aspect of the present invention, there is provided a porous separator of the following embodiments.

A first embodiment relates to a porous separator including a porous layer including plate-type inorganic particles, and a first binder polymer located on a part of or all surfaces of the plate-type inorganic particles, wherein the first binder polymer connects and fixes the plate-type inorganic particles.

A second embodiment relates to the porous separator of the first embodiment, further including a porous coating layer located on at least one surface of the porous layer, and including spherical inorganic particles, and a second binder polymer located on a part of or all surfaces of the spherical inorganic particles, wherein the second binder polymer connects and fixes the spherical inorganic particles.

A third embodiment relates to the porous separator of the first embodiment or the second embodiment, wherein the plate-type inorganic particles have an aspect ratio of 5 to 100.

A fourth embodiment relates to the porous separator of any one embodiment of the first embodiment to the third embodiment, wherein the plate-type inorganic particles include one or more selected from the group consisting of alumina, silica, zirconia, titanium dioxide, magnesia, cerin, yttrium oxide, zinc oxide, iron oxide, barium titanium oxide, and alumina-silica composite oxide.

A fifth embodiment relates to the porous separator of any one embodiment of the second embodiment to the fourth embodiment, wherein the spherical inorganic particles have an aspect ratio of 1 to 2.

A sixth embodiment relates to the porous separator of any one embodiment of the second embodiment to the fifth embodiment, wherein the spherical inorganic particles include one or more selected from the group consisting of alumina, and silica.

A seventh embodiment relates to the porous separator of any one embodiment of the first embodiment to the sixth embodiment, wherein the porous layer further includes spherical inorganic particles.

According to another aspect of the present invention, there is provided an electrochemical device of the following embodiments.

An eighth embodiment relates to an electrochemical device including a cathode, an anode, and a separator provided between the cathode and the anode, wherein the separator is the porous separator of any one embodiment of the first embodiment to the seventh embodiment.

A ninth embodiment relates to the electrochemical device of the eighth embodiment, which is a lithium secondary battery.

Advantageous Effects

According to one embodiment of the present invention, providing a base layer including plate-type inorganic particles is capable of increasing a path between a positive electrode/a negative electrode, that is, so-called tortuosity, and even when dendrite is produced in a battery, the corresponding dendrite is difficult to reach a positive electrode from a negative electrode, and reliability for a dendrite short may be further increased.

In addition, by a porous separator according to one embodiment of the present invention being not provided with a porous polymer substrate, an effect of reducing costs is obtained, a uniform porous separator is obtained by controlling pore sizes and porosity of the whole separator, and the weight may be reduced by reducing a thickness of the separator. In addition, an advantage of improving safety is obtained since there is no phenomenon such as thermal shrinkage even when exposed to a high temperature of 120° C. or higher.

BEST MODE

Hereinafter, the present invention will be described in detail. Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

A porous separator according to one aspect of the present invention is provided with a porous layer including a number of plate-type inorganic particles, and a first binder polymer located on a part or all of surfaces of the plate-type inorganic particles to connect and fix the plate-type inorganic particles.

The porous separator of the present invention may perform a role of a separator by being provided between a cathode and an anode as to be described later. Therefore, the porous separator may correspond to a porous separator (separating film, separator), and may also correspond to an organic-inorganic composite since an organic material and an inorganic material are mixed in terms of forming components.

Such an organic-inorganic composite is formed only with an inorganic material and a binder polymer without a porous polymer substrate such as polyolefin, and therefore, compared to a common separator formed with a porous polymer substrate, the separator is not thermally shrunk even when exposed to a high temperature of 120° C. or higher, and is not decomposed or damaged even when a temperature increases up to near a melting point of a polymer substrate, and as a result, possibility of a short circuit of a cathode and an anode may be fundamentally blocked, and the weight may be reduced by reducing a thickness of the separator.

Meanwhile, in order to safely use an electrochemical device such as a secondary battery for a long period of time, it is necessary to suppress foreign metal ions in a battery produced during charge and discharge forming dendrite by reduction on a negative electrode surface and an internal short phenomenon of the battery caused by such dendrite. In addition, from the viewpoint of manufacturing qualities of a cell, defect rates during cell manufacturing increases due to dendrite produced by reduction of such metal ions in charge and discharge of the cell manufacturing process. Moreover, when dendrite produced during the manufacturing process electrically connects a cathode and an anode by external pressure or vibration, problems may occur in safety and stability of a battery during use, and reduction of metal ions additionally produced during battery use also causes dendrite formation greatly harming safety and stability of the cell. Accordingly, in such a lithium secondary battery, dendrite formation and growth that may electrically connect a cathode and an anode inside the battery need to be suppressed.

When using a porous organic-inorganic layer provided with inorganic particles as a separator, pores of such a porous organic-inorganic layer, that is, space and path between inorganic particles may have a significant effect on dendrite growth and an electrical short circuit phenomenon between a cathode and an anode. Dendrite produced by metal ions being reduced and precipitated on an anode surface may have its growth suppressed or delayed when time taken for the metal ions to pass through a separator and be transferred to an anode increases, or, even when the metal ions pass through the separator and dendrite is precipitated on a negative electrode surface, when a path connected to an opposite cathode resulting from the precipitation and the growth is complicated or the time taken increases.

The travel path in such a porous organic-inorganic layer provided with inorganic particles affecting precipitation and growth of foreign metal ions may be explained by tortuosity.

Figure 1:
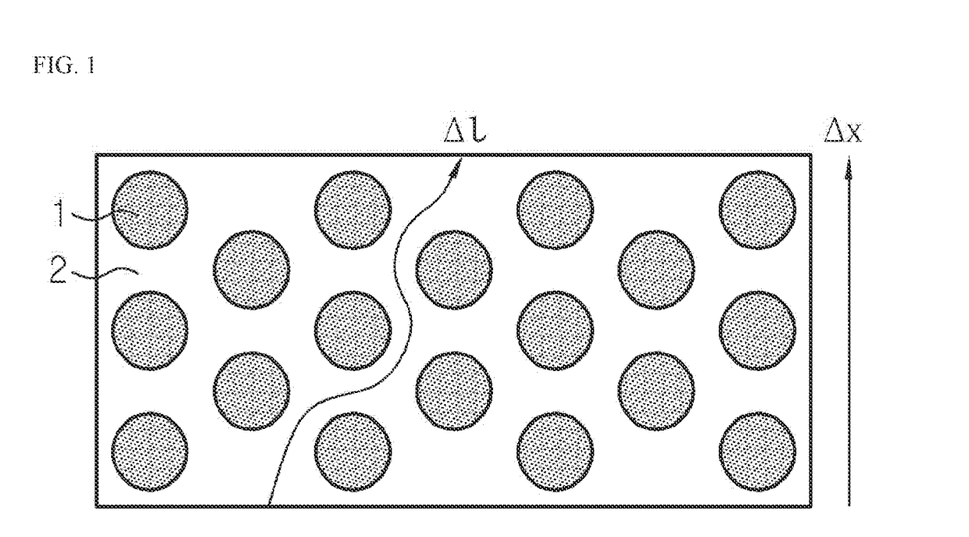
FIG. 1 is a mimetic diagram explaining tortuosity in a porous layer formed with inorganic particles.

Tortuosity is a value quantifying how much a curve is bent or twisted, and this tortuosity is generally often used when describing diffusion that occurs in porous materials. When referring to FIG. 1, tortuosity τ may be defined as follows.

$$\tau = \frac{\Delta \iota}{\Delta \chi},$$

herein, $\Delta\iota$: actual travel length, $\Delta\chi$: unit length.

In other words, even when a thickness of a porous layer formed with a number of particles (1) corresponds to $\Delta\chi$, time taken to pass through pores (2) of the porous layer and pass from one side to an opposite side is proportional to $\Delta\iota$, an actual travel distance.

Figure 2:
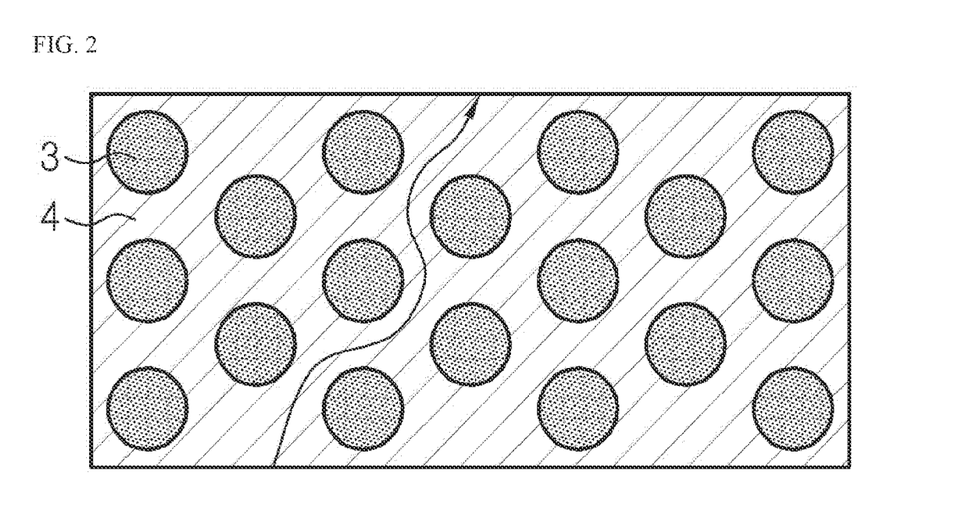
FIG. 2 is a mimetic diagram explaining tortuosity in a porous layer formed with spherical inorganic particles.
Figure 3:
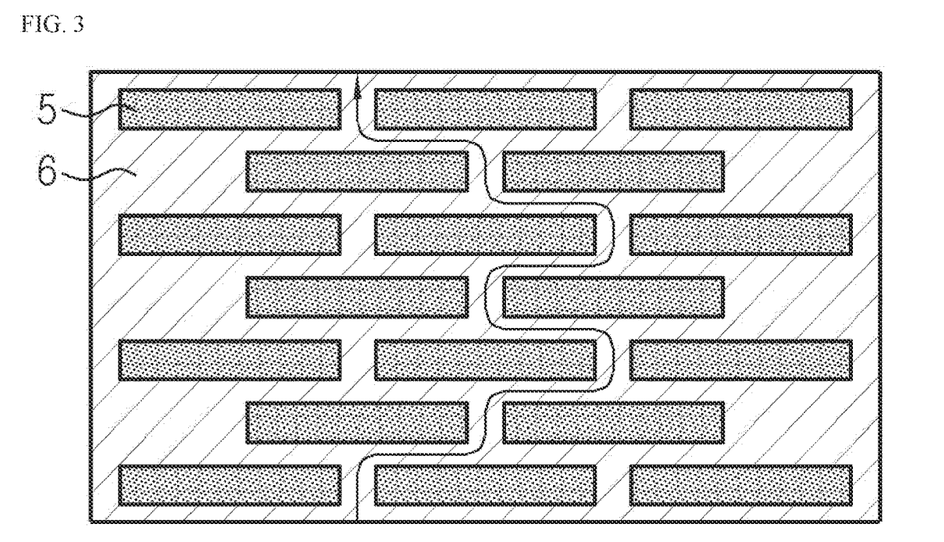
FIG. 3 is a mimetic diagram explaining tortuosity in a porous layer formed with plate-type inorganic particles.

When referring to FIG. 2 and FIG. 3, it is seen that, in a porous separator provided with a binder polymer and inorganic particles, an actual travel distance may be significantly different depending on the type of the inorganic particles. Inorganic particles (3) having a spherical shape as in FIG. 2 has a small degree of twist in a path passing through pores (4, 6) compared to inorganic particles (5) having a plate shape as in FIG. 3, which allows passing from one side to an opposite side through a shorter travel length. From this, it is seen that dendrite growth and a resulting short circuit phenomenon are suppressed when an inorganic particle shape of the porous separator is a plate shape compared to a spherical shape since, with a travel length increase, it is difficult and takes much longer time for dendrite formed on an anode surface to grow, pass through pores of a separator, and be connected to a cathode side.

Accordingly, the present invention provides a porous separator including a porous layer provided with plate-type inorganic particles.

Figure 4:
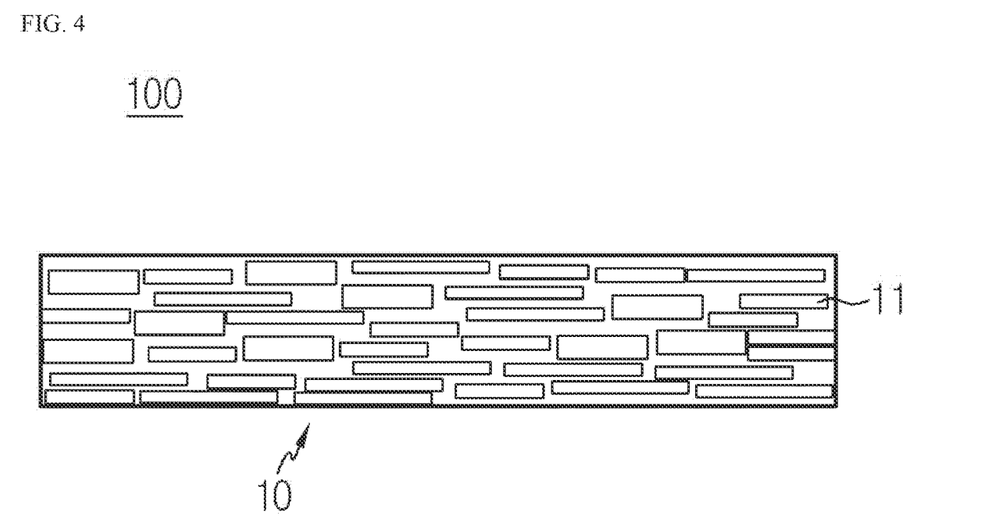
FIG. 4 is a schematic diagram of a porous separator according to one embodiment of the present invention.

When referring to FIG. 4, the porous separator (100) according to one embodiment of the present invention is provided with a porous layer (10) including a number of plate-type inorganic particles (11), and a first binder polymer (not shown) located on a part or all of surfaces of the plate-type inorganic particles (11) to connect and fix the plate-type inorganic particles.

In addition, according to one embodiment of the present invention, a porous coating layer located on at least one surface of the porous layer, and including a number of spherical inorganic particles, and a second binder polymer located on a part or all of surfaces of the spherical inorganic particles to connect and fix the spherical inorganic particles may be further provided.

Compared to a case in which a porous separator is composed of a porous layer formed with a plate-type inorganic particles, further providing a porous coating layer additionally including spherical inorganic particles enables lithium ions coming from an electrode to uniformly spread to and pass through a separator. When the spherical inorganic particles are uniformed dispersed into the coating layer herein, lithium ions may more uniformly pass through the separator. When a coating layer is formed by uniformly dispersing the spherical inorganic particles, pores of the coating layer are also uniformly distributed, and therefore, lithium ions may enter into evenly dispersed pores. Specifically, lithium ions may be plated on an electrode by passing through a porous layer of plate-type inorganic particles with difficulty, and then uniformly passing through a porous coating layer of spherical inorganic particles on an opposite side. In other words, the spherical inorganic particles are for making lithium ion transfer and distribution uniform, and the plate-type inorganic particles may reduce a short circuit phenomenon of a battery by making lithium ion passing difficult.

Figure 5:
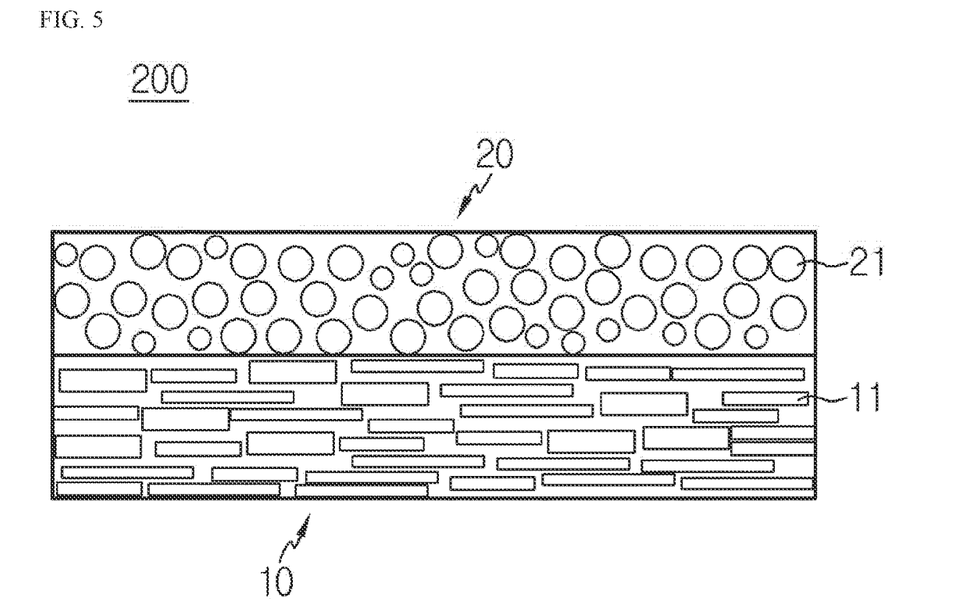
FIG. 5 is a schematic diagram of a porous separator according to one embodiment of the present invention.

When referring to FIG. 5, the porous separator (200) according to one embodiment of the present invention is provided with a porous layer (10) including a number of plate-type inorganic particles (11), and a first binder polymer (not shown) located on a part or all of surfaces of the plate-type inorganic particles (11) to connect and fix the plate-type inorganic particles; and a porous coating layer (20) located on one surface of the base porous layer, and including a number of spherical inorganic particles (21), and a second binder polymer (not shown) located on a part or all of surfaces of the spherical inorganic particles (21) to connect and fix the spherical inorganic particles.

Figure 6:
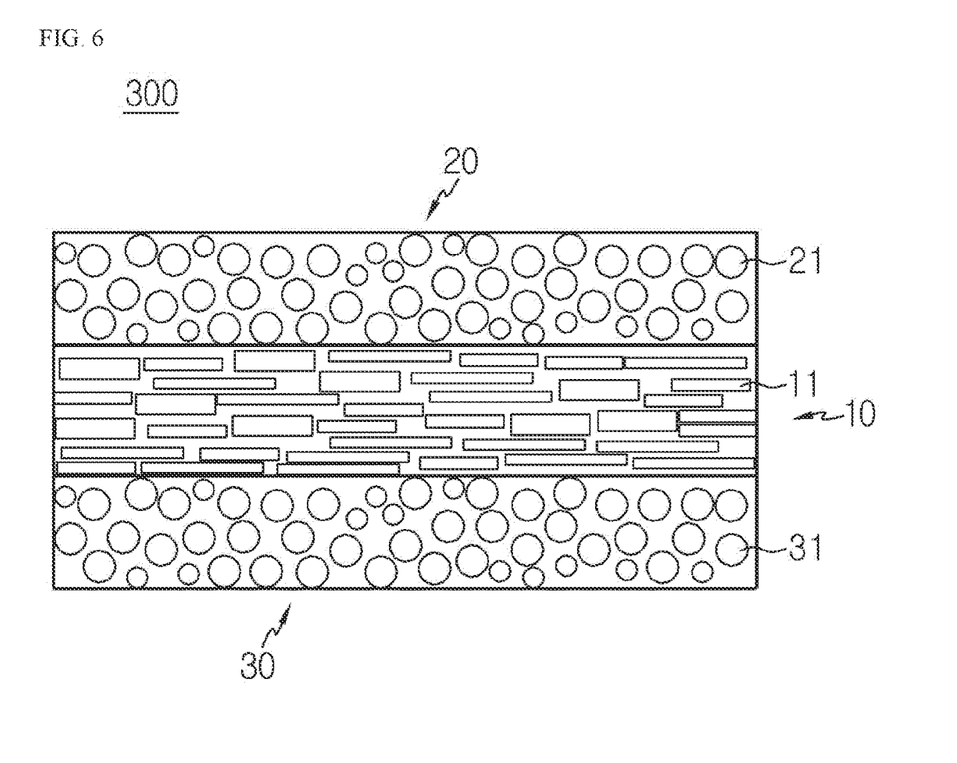
FIG. 6 is a schematic diagram of a porous separator according to one embodiment of the present invention.

In addition, the porous separator (300) according to one embodiment of the present invention illustrated in FIG. 6 is provided with a porous layer (10) including a number of plate-type inorganic particles (11), and a first binder polymer (not shown) located on a part or all of surfaces of the plate-type inorganic particles (11) to connect and fix the plate-type inorganic particles; a porous coating layer (20) located on one surface of the base porous layer, and including a number of spherical inorganic particles (21), and a second binder polymer (not shown) located on a part or all of surfaces of the spherical inorganic particles (21) to connect and fix the spherical inorganic particles; and a porous coating layer (30) located on the other surface of the base porous layer, and including a number of spherical inorganic particles (31), and a second binder polymer (not shown) located on a part or all of surfaces of the spherical inorganic particles (31) to connect and fix the spherical inorganic particles.

According to one embodiment of the present invention, the inorganic particles may be formed only with plate-type inorganic particles in the porous layer, or may be provided with 50% by weight or greater, and specifically 50% by weight to 90% by weight of plate-type inorganic particles with respect to the total inorganic particle weight of the porous layer. In the latter case, spherical inorganic particles may be further included as the inorganic particles of the porous layer.

In addition, according to one embodiment of the present invention, the inorganic particles may be formed only with spherical inorganic particles in the porous coating layer, or may be provided with 50% by weight or greater, and specifically 50% by weight to 90% by weight of spherical inorganic particles with respect to the total inorganic particle weight of the porous coating layer. In the latter case, plate-type inorganic particles may be further included as the inorganic particles of the porous coating layer.

Nonlimiting examples of the plate-type inorganic particle may include alumina, silica, zirconia, titanium dioxide, magnesia, ceria, yttrium oxide, zinc oxide, iron oxide, barium titanium oxide, alumina-silica composite oxide, or a mixture of two or more thereof.

Nonlimiting examples of the spherical inorganic particle may include high dielectric inorganic particles having a dielectric constant of 5 or greater and specifically 10 or greater, inorganic particles having a lithium ion transferring ability, or a mixture thereof.

Nonlimiting examples of the inorganic particle having a dielectric constant of 5 or greater may include $BaTiO_3$, $Pb(Zr,TiO)O_3(PZT)$, $Pb_{1-x}La_xZr_{1-y}Ti_yO_3$ (PLZT), $PB(Mg_3Nb_{2/3}) O_3-PbTiO_3(PMN-PT)$, hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC AlO(OH), $Al_2O_3.H_2O$, or a mixture thereof.

In addition, the inorganic particle having a lithium ion transferring ability refers to an inorganic particle containing a lithium element, but having a function of moving lithium ions instead of storing lithium, and nonlimiting examples of the inorganic particle having a lithium ion transferring ability may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ series glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ series glass ($Li_xSi_yS_z$, $0<x<3$, $0<y<2$, $0<z<4$) such as $Li_3PO_4-Li_2S-SiS_2$, $P_2S_5$ series glass ($Li_xP_yS_z$, $0<x<3$, $0<y<3$, $0<z<7$) such as $LiI-Li_2S-P_2S_5$, or a mixture thereof.

The plate-type inorganic particle may have an aspect ratio of 5 to 100 and specifically 50 to 100.

The spherical inorganic particle may have an aspect ratio of 1 to 2 and specifically 1 to 1.5.

Herein, the aspect ratio means an average value of a ratio of a length in a long axis direction and a length in a short axis direction of the inorganic particle (length in a long axis direction/length in a short axis direction).

The aspect ratio, that is, an average value of a ratio of a length in a long axis direction and a length in a short axis direction of the inorganic particle may be obtained by, for example, image analyzing an image taken by a scanning electron microscope. In addition, the aspect ratio of the inorganic particle may also be obtained by image analyzing an image taken by an SEM.

In the porous separator according to one aspect of the present invention, polymers having a glass transition temperature ($T_g$) of $-200°$ C. to $200°$ C. may be used as the first binder polymer and the second binder polymer used, and this is due to the fact that mechanical properties such as flexibility and elasticity of the finally formed porous separator may be enhanced. Such a binder polymer contributes to preventing mechanical property decline in the porous separator by faithfully performing a role of a binder connecting and stably fixing the inorganic particles.

In addition, the first binder polymer and the second binder polymer do not necessarily have an ion conducting ability, however, performance of an electrochemical device may be further enhanced when using a polymer having an ion conducting ability. Accordingly, those having a high dielectric constant may be used as the first binder polymer and the second binder polymer. In fact, the degree of dissociation of a salt in an electrolyte liquid depends on a dielectric constant of an electrolyte liquid solvent, and therefore, the degree of dissociation of a salt may be enhanced in an electrolyte as a dielectric constant of the binder polymer increases. As dielectric constants of such a first binder polymer and a second binder polymer, the range of 1.0 to 100 (measuring frequency=1 kHz) may be used, and particularly, 10 or greater may be used.

In addition to the above-described functions, the first binder polymer and the second binder polymer may have properties of exhibiting high degree of electrolyte liquid swelling by being gelled when impregnated into a liquid electrolyte liquid. Therefore, a solubility parameter of the binder polymer, that is, a Hildebrand solubility parameter, is in a range of 15 $MPa^{1/2}$ to 45 $MPa^{1/2}$ or 15 $MPa^{1/2}$ to 25 $MPa^{1/2}$ and 30 $MPa^{1/2}$ to 45 $MPa^{1/2}$. Accordingly, hydrophilic polymers having more polar functional groups may be more used than hydrophobic polymers such as polyolefins. This is due to the fact that swelling by a common liquid electrolyte liquid for a battery may be difficult when the solubility parameter is less than 15 $MPa^{1/2}$ or greater than 45 $MPa^{1/2}$.

In the porous separator, the inorganic particles are bound to each other by the first binder polymer and the second binder polymer while being charged and in contact with each other, and an interstitial volume is formed between the inorganic particles as a result, and the interstitial volume between the inorganic particles becomes empty space to form pores.

In other words, the first binder polymer and the second binder polymer adhere the inorganic particles so that the inorganic particles may remain bound to each other, and for example, the first binder polymer and the second binder polymer connect and fix the inorganic particles. In addition, pores of the porous separator are pores formed by an interstitial volume between the inorganic particles becoming empty space, and this is space limited by the inorganic particles that are substantially interfaced in a closed packed or densely packed structure by the inorganic particles.

As such a first binder polymer and a second binder polymer, those satisfying the above-described weight average molecular weight and commonly used in the art may be used without limit. One example thereof may include polyvinylidene fluoride, polyvinylidene fluoride-co-hexafluoropropylene, polyvinylidene fluoride-co-trichloroethylene, polyimide, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose and the like, but is not limited thereto.

A weight of the first binder polymer with respect to the total weight of the porous layer may be from 0.1% by weight to 30% by weight, specifically from 0.3% by weight to 25% by weight, and more specifically from 0.5% by weight to 20% by weight.

In addition, a weight of the second binder polymer with respect to the total weight of the porous coating layer may be from 0.1% by weight to 30% by weight, specifically from 0.3% by weight to 25% by weight, and more specifically from 0.5% by weight to 20% by weight.

When the weights of the first binder polymer and the second binder polymer each satisfy such a range, a problem of reducing pore size and porosity caused by an excess amount of the binder polymer present in the formed pores of the porous separator may be prevented, and inorganic particles may be stably fixed by the binder polymer without being desorbed during the preparation of the porous separator, or storage or operation of an electrochemical device provided with such a porous separator.

The porous separator according to one aspect of the present invention may further include, in addition to the inorganic particles and the binder polymers described above, other additives.

The porous separator according to one embodiment of the present invention may be prepared by first preparing a base layer composition provided with plate-type inorganic particles and a first binder polymer, coating such a composition on one surface of a release substrate, drying the result, and then removing the release substrate. Alternatively, a composition for forming the porous separator is directly coated on one surface of an electrode layer such as a cathode or an anode, and then dried to be prepared as an electrode-porous layer composite directly bound to the electrode layer.

First, the base layer composition may be prepared by dissolving a first binder polymer in a solvent, adding plate-type inorganic particles thereto, and dispersing the result. The plate-type inorganic particles may be added in a state of being crushed in advance so as to have a certain average particle diameter, or after adding the inorganic particles to a solution of the binder polymer, the inorganic particles may be crushed and dispersed while controlling to have a certain average particle diameter using a ball mill method and the like.

A method of coating the base layer composition on the release substrate or the electrode layer is not particularly limited, however, using slot coating, comma coating, curtain coating, micro-gravure coating, spin coating, roll coating, dip coating or the like is preferred.

The slot coating is a method of coating a composition supplied through a slot die on the entire surface of a substrate, and the coating layer thickness may be adjusted depending on the flow rate supplied from a metering pump. In addition, the dip coating is a method of coating by immersing a substrate in a tank containing a composition, and the coating layer thickness may be adjusted depending on the composition concentration and the speed of taking the substrate out of the composition tank, and for more precise adjustment of coating thickness, post-weighing may be performed after immersion through a Meyer bar or the like.

By drying the release substrate coated with the composition for forming a porous separator at a temperature of, for example, 90° C. to 150° C. using a dryer such as an oven and then removing the release substrate, a porous layer is prepared. As such a release substrate, a glass plate, a polyethylene-based film, a polyester-based film and the like may be used, however, the release substrate is not limited thereto. Selectively, a surface of the release substrate may be surface modified by corona treatment (for example, treated for 10 seconds to 30 seconds at a voltage of 0.5 kV to 1.5 kV) and the like.

Alternatively, when the base layer composition is directly coated on the electrode layer, this may be dried in the same manner to be prepared as an electrode-porous layer composite bound to the electrode layer.

The coating thickness of the porous layer formed by coating in the above-mentioned manner may be from 5 μm to 20 μm and specifically from 5 μm to 20 μm.

Next, a porous coating layer may be additionally formed after coating a porous coating layer composition on at least one surface of the prepared porous layer, and drying the result.

The porous coating layer composition may be prepared by dissolving a second binder polymer in a solvent, then adding spherical inorganic particles thereto, and dispersing the result, and as for methods other than this, the methods of preparing a base layer composition may be used in the same manner.

When forming a porous coating layer on both surfaces of the porous layer, a dip coating method may be used, and when forming on just one surface, other various coating methods described above may be used.

The coating thickness of the porous coating layer formed by coating in the above-mentioned manner may be from 5 μm to 20 μm and specifically from 1 μm to 5 μm.

In the present invention, porosity is measured using a capillary flow porometer device of Porous Materials Inc.

According to one embodiment of the present invention, as for the type of presence of the plate-type inorganic particles in the porous layer, it is preferred that the plate surface is almost parallel to the surface of the porous layer.

An electrochemical device according to one aspect of the present invention includes a cathode, an anode, and a separator provided between the cathode and the anode, and the separator is the porous separator according to one embodiment of the present invention described above.

Such an electrochemical device includes all devices performing an electrochemical reaction, and specific examples thereof may include all types of primary, secondary batteries, fuel cells, solar cells, capacitors such as a super capacitor device, or the like. Particularly, among the secondary batteries, lithium secondary batteries including lithium metal secondary batteries, lithium ion secondary batteries, lithium polymer secondary batteries, lithium ion polymer secondary batteries or the like are preferred.

Both electrodes of the cathode and the anode to be used with the porous separator of the present invention are not particularly limited, and may be prepared in a form of binding an electrode active material on an electrode current collector according to common methods known in the art. Nonlimiting examples of the cathode active material of the electrode active material may include common cathode active materials that may be used in a cathode of an existing electrochemical device, and particularly, lithium manganese oxide, lithium cobalt oxide, lithium nickel oxide, lithium iron oxide, or lithium composite oxide combining these is preferably used. Nonlimiting examples of the anode active material may include common anode active materials that may be used in an anode of an existing electrochemical device, and particularly, lithium metal or lithium alloys, or lithium adsorbing materials such as carbon, petroleum coke, activated carbon, graphite or other carbon series, are preferred. Nonlimiting examples of the cathode current collector may include foil prepared with aluminum, nickel or a combination thereof, and nonlimiting examples of the anode current collector may include foil prepared with copper, gold, nickel, a copper alloy or a combination thereof.

An electrolyte liquid usable in the electrochemical device of the present invention is a salt having a structure such as $A^+B^-$, and may include those in which a salt that $A^+$ includes an ion formed with an alkali metal cation such as $Li^+$, $Na^+$, $K^+$, or a combination thereof, and $B^-$ includes an ion formed with an anion such as $PF_6^-$, $BF_4^-$, $Cl^-$, $Br^-$, $I^-$, $ClO_4^-$, $AsF_6^-$, $CH_3CO_2$, $CF_3SO_3^-$, $N(CF_3SO_2)_2^-$, $C(CF_2SO_2)_3^-$, or a combination thereof is dissolved or dissociated in an organic solvent formed with propylene carbonate (PC), ethylene carbonate (EC), diethyl carbonate(DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (g-butyrolactone) or a mixture thereof, however, the salt is not limited thereto.

The electrolyte liquid may be injected at a proper stage in a battery manufacturing process depending on a manufacturing process and required properties of a final product. In other words, the electrolyte liquid may be used at a stage prior to assembling a battery or at a final stage of battery assembly.

Hereinafter, the present invention will be described in detail with reference to examples in order to specifically describe the present invention. However, examples according to the present invention may be modified to various other forms, and the scope of the present invention may not be construed as being limited to the examples described below. The examples of the present invention are provided in order to more fully describe the present invention to those having average knowledge in the art.

EXAMPLE 1

<Preparation of Porous Separator 1>

After mixing a PVdF-HFP polymer binder (Arkema Group, LBG Grade) and inorganic particles (alumina, TCERA Co., Ltd., NW-710 Grade) in a ratio of 9:1, the result was mixed with N-methyl-2-pyrrolidone (NMP) solvent in a solid concentration of 40% to prepare a coating solution.

On a polyethylene terephthalate (PET) film (SKC, RX12G 50 μm) of which surface is corona treated with intensity of 0.7 Kw, the coating solution prepared above was coated using an applicator, and the result was dried for 5 minutes at 130° C. in a Mathis oven to prepare a porous separator-coated PET film having a thickness of 100 μm.

The porous separator-coated PET film was rolled in a roll press machine (calendering machine, CIS Co., Ltd., CLP-2025H) to prepare a porous separator to a thickness of 20 μm, and then peeled off.

<Preparation of Porous Separator 2>

A separator having a thickness of 10 μm was prepared in the same manner as the preparation of the porous separator except that spherical alumina (Dae Han Ceramics Co., Ltd., SRA-05S) was used.

<Manufacture of Lithium Secondary Battery>

96.7 parts by weight of $LiCoO_2$ functioning as a cathode active material, 1.3 parts by weight of graphite functioning as a conductor, and 2.0 parts by weight of polyvinylidene fluoride (PVdF) functioning as a binder were mixed to prepare a cathode mixture. By dispersing the obtained cathode mixture into 1-methyl-2-pyrrolidone functioning as a solvent, cathode mixture slurry was prepared. This slurry was coated on both surfaces of aluminum foil having a thickness of 20 μm, and dried and compressed to prepare a cathode.

As an anode, Li metal electrode (Honjo Metal Co., Ltd., Japan) having a 100% Li metal layer formed to a thickness of 20 μm on a copper foil current collector was used.

A non-aqueous electrolyte liquid was prepared by dissolving $LiPF_6$ in an organic solvent mixing ethylene carbonate (EC), diethyl carbonate (DEC) and dimethyl carbonate (DMC) in a composition of 1:2:1 (volume ratio) to have a concentration of 1.0 M, and dissolving 2 parts by weight of vinylene carbonate with respect to 100 parts by weight of the organic solvent.

A porous separator was provided between the cathode and the anode prepared above, and the electrolyte liquid was injected to manufacture a coin-cell type lithium secondary battery.

EXAMPLE 2

A lithium secondary battery was manufactured in the same manner as in Example 1 except that a three layer-structured separator obtained by, after placing the separator prepared in Preparation of Porous Separator 1 in the middle, disposing two sheets of the separators prepared in Preparation of Porous Separator 2 above and below thereof.

COMPARATIVE EXAMPLE 1

A lithium secondary battery was manufactured in the same manner as in Example 1 except that a CSP20 product manufactured by Optodot was used as the porous separator.

Evaluation on Physical Properties
Evaluation on Lifetime Properties

Each of the lithium secondary batteries of Examples 1 and 2 and Comparative Example 1 was, using a small cell cycler device of PNE SOLUTION Co., Ltd., CC charged up to 4.25 V with a constant current (CC) of 0.2 C, and then charged once with 5% current cut-off with respect to 1 C at a constant voltage of 4.25 V as charge, then discharged to 3 V with a constant current of 0.5 C. This was employed as 1 cycle, and such a cycle repeatedly progressed.

Figure 7:
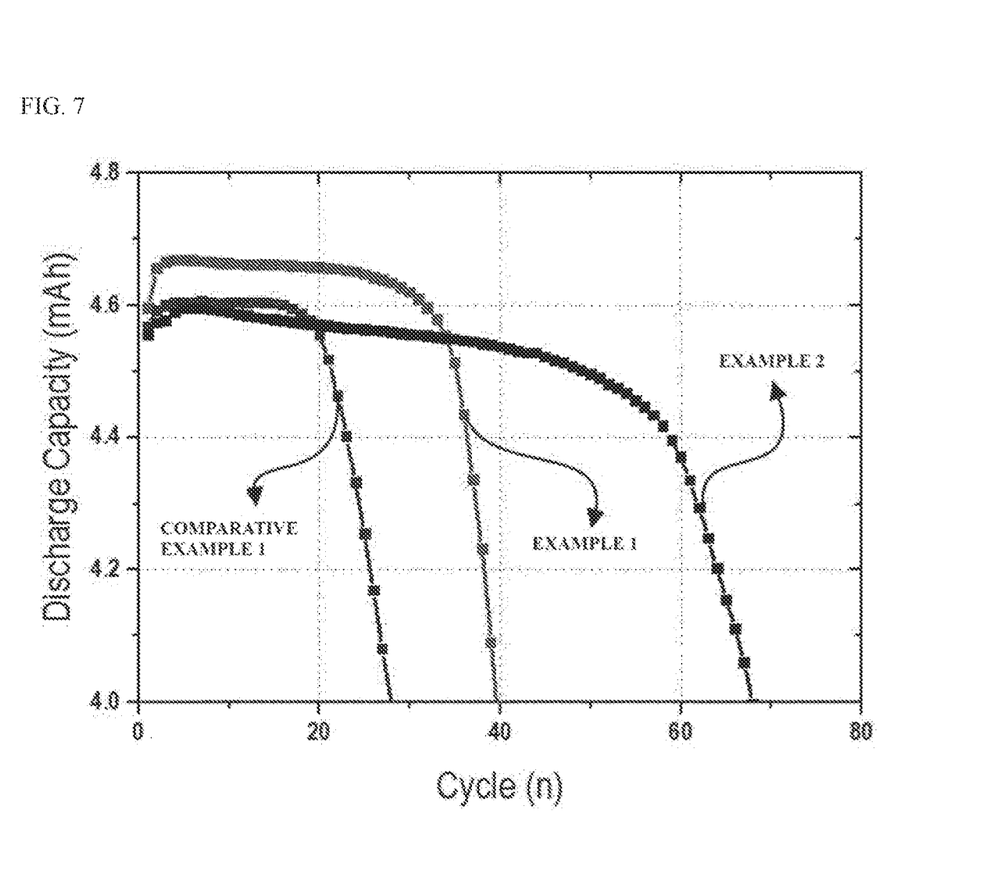
FIG. 7 is a graph presenting lifetime property evaluation results on Example 1, Example 2 and Comparative Example 1.

When referring to FIG. 7, it was seen that, whereas the porous inorganic separator of Comparative Example 1 started fading before 20 cycles, the porous separator of Examples 1 and 2 exhibited stable discharge capacity at a longer cycle. This is analyzed as a result of the porous separators of Examples 1 and 2 blocking dendrite longer. Particularly, it was seen that the dendrite-blocking effect was more superior and discharge capacity was further enhanced when a porous separator using both a layer of plate-type particles and a layer of spherical particles was used as in Example 2.

The invention claimed is:

1. A porous separator comprising:
    a porous layer comprising plate-type inorganic particles, and a first binder polymer located on a part of or all surfaces of the plate-type inorganic particles, wherein the first binder polymer connects and fixes the plate-type inorganic particles,
    a porous coating layer located on at least one surface of the porous layer, said porous coating layer consisting of spherical inorganic particles, and a second binder polymer located on a part of or all surfaces of the spherical inorganic particles, wherein the second binder polymer connects and fixes the spherical inorganic particles.

2. The porous separator of claim 1, wherein the plate-type inorganic particles have an aspect ratio of 5:1 to 100:1.

3. The porous separator of claim 1, wherein the porous layer further comprises second spherical inorganic particles.

4. The porous separator of claim 1, wherein the plate-type inorganic particles comprise one or more selected from the group consisting of alumina, silica, zirconia, titanium dioxide, magnesia, cerin, yttrium oxide, zinc oxide, iron oxide, barium titanium oxide, and alumina-silica composite oxide.

5. The porous separator of claim 1, wherein the spherical inorganic particles have an aspect ratio of 1:1 to 2:1.

6. The porous separator of claim 1, wherein the spherical inorganic particles comprise one or more selected from the group consisting of alumina, and silica.

7. An electrochemical device comprising:
a cathode;
an anode; and
a separator provided between the cathode and the anode, wherein the separator is the porous separator of claim 1.

8. The electrochemical device of claim 7, which is a lithium secondary battery.

* * * * *